April 1, 1952     J. MILLMAN ET AL     2,591,088
VIDEO BLANKING CIRCUIT
Filed Nov. 30, 1945

INVENTORS
JACOB MILLMAN
RICHARD C. ALLEN
BY

ATTORNEY

Patented Apr. 1, 1952

2,591,088

UNITED STATES PATENT OFFICE 2,591,088

VIDEO BLANKING CIRCUIT

Jacob Millman, Brookline, Mass., and Richard C. Allen, Carthage, Mo., assignors, by mesne assignments, to the United States of America as represented by the Secretary of the Navy Application November 30, 1945, Serial No. 631,955

3 Claims. (Cl. 178—7.1)

This invention relates in general to electrical control circuits and more particularly concerns an improved blanking or switching circuit having inherent high stability and linearity.

A blanking circuit is broadly defined as one which is intermittently rendered inoperative for a predetermined time by a blanking signal so as to remove a portion of the circuit output signal. Blanking may be accomplished in a conventional amplifier circuit by using a negative blanking signal, impressed upon a grid thereof, to cutoff the tube during the blanking period.

The need for signal blanking is often encountered in video systems. As an example, consider the particular problem presented by a radar having an antenna which transmits and receives energy in a low horizontal plane. The echoes from such a transmission include permanent echoes, that is, reflections from low, fixed objects and produce, upon an indicator, a confused pattern known as ground clutter. The range covered by this ground clutter is dependent upon the antenna radiation pattern and the terrain about the insulation. A blanking circuit may be used in connection with the receiver operated from this antenna to remove the output signal for the period of time corresponding to the maximum range of this undesired ground clutter. To improve the effectiveness of the system indication, another radar may be utilized with an antenna having its principal radiation directed above the ground to avoid ground clutter, and the echoes received therefrom may be superimposed upon the signal output of the aforementioned blanking circuit. The result is a continuous indication from zero range, with the limitation that targets in the range covered by the blanking period must be high in order to appear at all.

Although this radar system is not the specific subject of the present invention it is illustrative of a requirement for blanking with video pulses. For such operation, ordinary grid circuit blanking is not feasible due to instability and the variable effects of interelectrode capacitances and other tube parameter changes. This invention therefore contemplates and has as its primary object the provision of a simplified video blanking circuit of improved performance, resulting from an inherently stable electrical circuit.

Another object of this invention is to provide a blanking circuit including a highly degenerative electron tube and operative upon the application of small positive voltage to the cathode thereof.

A further object of this invention is to provide a blanking circuit having a substantially linear variation of output signal as a function of input signal and which is substantially unaffected by ordinary variations of circuit components.

These and other objects of our invention will now become apparent from the following detailed specification taken in connection with the accompanying drawings, in which.

Figure 1:
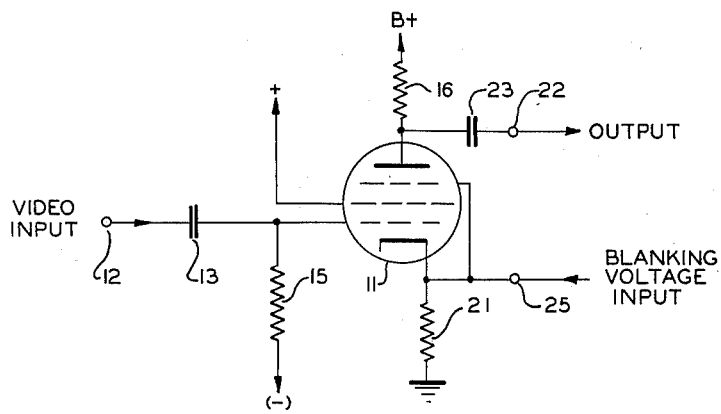
Fig. 1 is a schematic diagram of the novel video blanking circuit.

Referring now to Fig. 1, it may be seen that the video blanking circuit comprises essentially a pentode electron tube 11 connected for extremely low gain. A video input signal applied at terminal 12 is coupled through blocking capacitor 13 to the control grid of the pentode tube 11. A source of negative potential, not shown, is used to bias the control grid through grid leak resistor 15. The anode or plate of the electron tube 11 is returned to a positive power supply through a plate load resistor 16, which is comparatively small, that is, of the order of 1000 ohms as is required for successful video amplification. The screen grid of the pentode is connected directly to a positive power source. In order to minimize the gain of the pentode 11 and thereby provide a high degree of circuit stability, a considerable amount of degenerative feedback is provided through the use of an unbypassed cathode resistor 21 which is equal to or of the same order as the plate load resistor 16. The pentode suppressor grid is returned to the cathode and the circuit output voltage developed across plate load resistor 16 is taken at terminal 22 from the tube plate through coupling capacitor 23.

The grid bias voltage is arranged to provide a tube quiescent condition near cutoff, so that the zero signal plate current is practically zero. However, the low circuit gain resulting from the degenerative voltage developed across cathode resistor 21 establishes a substantially linear variation between input and output signals. Accordingly, during normal operation, the signal output appearing at terminal 22 will be substantially the equivalent of the circuit input at terminal 12.

Blanking or the removal of any portion of the output wave is accomplished by the application at cathode terminal 25 of a substantially square positive voltage wave, the duration of which is dependent upon the desired blanking period. Inasmuch as the pentode blanking circuit 11 is practically cutoff, an extremely small positive voltage step is required to completely blank the output signal, thereby providing the desirable feature of high circuit sensitivity. Inasmuch as the blanking voltage is applied to the cathode relatively no difficulty is experienced due to interelectrode capacitive coupling at the frequencies of operation. This particular feature of the video blanking circuit 11 permits the replacement of tubes to be affected without consideration for the differences in tube circuit parameters normally present. Summarizing therefore, the video blanking circuit illustrated in Fig. 1 provides stability and linearity and permits successful operation with comparatively small blanking voltages.

Figure 2:
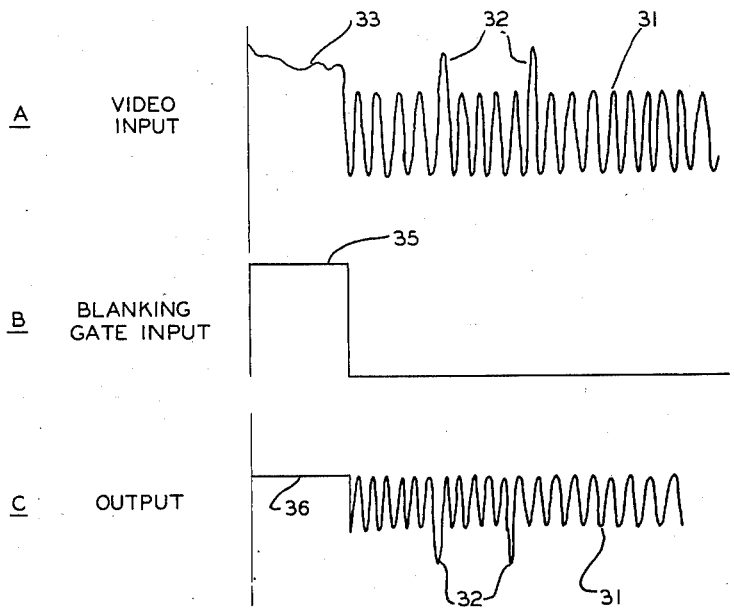
Fig. 2 is a graphical representation of the voltage wave form appearing in connection with the circuit of Fig. 1.

The voltage wave forms which appear during the operation of the blanking circuit of Fig. 1 are illustrated in Fig. 2 and reference is now made thereto. Fig. 2a illustrates the normal input voltage wave form applied at terminal 12 of the blanking circuit if the circuit is incorporated in a radar system of the type hereinabove described. Thus this signal comprises the video, or time variation of voltage of the radar receiver output in the period between transmitted pulses. This signal includes an irregular but comparatively small noise voltage 31 and the larger voltage pulses 32 indicating targets at a particular range. Also appearing upon the receiver output trace illustrated in Fig. 2a is the confused pattern or ground clutter 33, resulting from permanent echoes of ground objects due to the low radiation angle of the antenna. Inasmuch as the ground clutter 33 has comparatively no meaning, it is desirable that this signal be blanked out. In Fig. 2b there is shown a blanking signal of the type and duration to be applied to the cathode terminal 25 of the blanking circuit in Fig. 1 for the removal of the ground clutter 33. This positive rectangular voltage step 35 when applied renders the pentode 11 inoperative for the duration of the step, with the result that the blanking circuit output signal appears as illustrated in Fig. 2c. This wave form is inverted due to the action of the amplifier 11, but contains the target echoes 32 and noise 31 as previously described in connection with Fig. 2a. However, the ground clutter 33 has been removed.

Dependent upon the particular application of the circuit illustrated, the blanked out period 36 of the wave form Fig. 2 may be given meaning by the superposition of a voltage wave form obtained from another transmitting and receiving antenna having a high radiation angle. The result is not shown in this particular application as it is not obtained in the blanking circuit, but consists essentially of a continuous wave form from zero range to the maximum range in which targets are indicated for the full range. During the blanking period, however, the targets appearing are only those from elevated objects as detected by the antenna having the elevated radiation pattern.

This particular application of the blanking circuit illustrated in Fig. 1 is merely illustrative of the operation thereof. It may, however, be incorporated in any of the circuits requiring video blanking, and it is apparent that various modifications of the circuit illustrated may be affected by those skilled in the art. We prefer, therefore, that this invention be limited, not by the specific disclosures hereinabove set forth, but by the spirit and scope of the appended claims.

What is claimed is:

1. An electrical circuit comprising, a source of a train of video signals, a source of positive square voltage pulses of predetermined amplitude and duration, a pentode electron tube including an anode, a cathode, and a control grid, said control grid being biased to hold said pentode in a quiescent condition near cutoff, equal impedances in the anode and cathode circuits of said pentode, means for applying said train of video signals to said control grid, means for applying said square voltage pulses to said cathode, and means for deriving from said anode an output signal substantially the same as said train of video signals but having a portion thereof blanked, said portion being equal in duration to that of each of said positive square voltage pulses.

2. A circuit for blanking a predetermined portion of a train of signals comprising, a pentode electron tube including a cathode, an anode and a control grid, means for maintaining said pentode electron tube in a quiescent condition near cutoff, a source of input video signals connected to said grid, a source of positive square voltage pulses, each of said square voltage pulses having a duration equal to that of said predetermined portion of video signals, means for applying said positive square voltage pulses to said cathode to cut off conduction in said pentode electron tube for the duration of said square voltage pulses, an anode load resistor connected to said anode, a cathode resistor substantially similar to said anode load resistor connecting said cathode to ground, and an output circuit connected to said anode for providing output signals substantially similar to said input video signals, but having a portion thereof blanked, said portion being determined by the duration of said square voltage pulses.

3. A circuit for blanking a predetermined portion of a train of signals comprising, a pentode electron tube having a cathode, an anode, a control grid, a screen grid and a suppressor grid, first and second sources of positive voltage, said screen grid being directly connected to said first source of positive voltage, a first resistor connecting said anode to said second source of positive voltage, a second resistor substantially similar to said first resistor connecting said cathode to ground, a source of negative voltage, a third resistor connecting said control grid to said source of negative voltage to maintain said pentode in quiescent condition at a point near cutoff, a source of video signals, a first capacitor connecting said source of video signals to said control grid, a source of positive square voltage pulses connected to said cathode and to said suppressor grid, and a second capacitor connected to the junction of said anode and said first resistor for providing output signals substantially similar to said input video signals but having a portion thereof blanked.

JACOB MILLMAN.
RICHARD C. ALLEN.

REFERENCES CITED

The following references are of record in the file of this patent:

UNITED STATES PATENTS

| Number | Name | Date |
|---|---|---|
| 2,233,317 | Konkle | Feb. 25, 1941 |
| 2,245,428 | Campbell | June 10, 1941 |
| 2,286,450 | White et al. | June 16, 1942 |
| 2,299,945 | Wendt | Oct. 27, 1942 |
| 2,307,218 | Hardwick | Jan. 5, 1943 |
| 2,307,375 | Blumlein et al. | Jan. 5, 1943 |
| 2,356,141 | Applegarth | Aug. 22, 1944 |
| 2,403,549 | Poch | July 9, 1946 |

FOREIGN PATENTS

| Number | Country | Date |
|---|---|---|
| 521,367 | Great Britain | May 20, 1940 |